United States Patent
Tries et al.

(10) Patent No.: US 8,186,944 B2
(45) Date of Patent: May 29, 2012

(54) TURBOCHARGER COMPRISING ADJUSTABLE GUIDE BLADES, BLADE LEVER AND ADJUSTING RING THEREFOR

(75) Inventors: Timo Tries, Schwieberdingen (DE); Ralf Boening, Reiffelbach (DE)

(73) Assignee: BorgWarner Inc., Auburn Hills, MI (US)

( * ) Notice: Subject to any disclaimer, the term of this patent is extended or adjusted under 35 U.S.C. 154(b) by 930 days.

(21) Appl. No.: 12/279,709

(22) PCT Filed: Feb. 14, 2007

(86) PCT No.: PCT/EP2007/001292
§ 371 (c)(1),
(2), (4) Date: Aug. 15, 2008

(87) PCT Pub. No.: WO2007/093407
PCT Pub. Date: Aug. 23, 2007

(65) Prior Publication Data
US 2009/0022581 A1    Jan. 22, 2009

(30) Foreign Application Priority Data
Feb. 16, 2006 (DE) .......................... 10 2006 007 318

(51) Int. Cl.
*F01D 17/12* (2006.01)
(52) U.S. Cl. ...................................... 415/164
(58) Field of Classification Search .................. 415/164; 29/889.2, 889.21, 889.22
See application file for complete search history.

(56) References Cited

U.S. PATENT DOCUMENTS

| | | | |
|---|---|---|---|
| 2,860,827 A | 11/1958 | Egli | |
| 2006/0112690 A1* | 6/2006 | Hemer | 60/602 |
| 2007/0172348 A1* | 7/2007 | Battig | 415/160 |
| 2008/0031728 A1* | 2/2008 | Sausse et al. | 415/160 |

FOREIGN PATENT DOCUMENTS

| | | | |
|---|---|---|---|
| DE | 10238412 A1 | | 3/2004 |
| DE | 10 2004 023 282 | * | 12/2005 |
| DE | 102004023209 A1 | | 12/2005 |
| EP | 1357255 | * | 10/2003 |
| EP | 1357255 A1 | | 10/2003 |
| EP | 1391585 A2 | | 2/2004 |
| EP | 1635040 | * | 3/2006 |
| EP | 1635040 A1 | | 3/2006 |

* cited by examiner

*Primary Examiner* — Steven Loke
*Assistant Examiner* — Victoria Hall
(74) *Attorney, Agent, or Firm* — William G. Anderson; Stephan A. Pendorf; Patent Central LLC

(57) ABSTRACT

A turbocharger (1) with a variable turbine geometry (VTG), includes a guide baffle (18), which has a blade bearing ring (6) with a plurality of guide blades (7), each of the latter having a blade shaft (8) that is mounted on the blade bearing ring (6). The guide baffle also has an adjusting ring (5), which interacts with the guide blades (7) by means of associated blade levers (20), which are fixed to the blade shafts (8) by one of their ends (21). The other end (22) of each blade lever (20) is provided with a lever head (23), which can be engaged in an associated engagement recess (24) of the adjusting ring (5). Each blade lever (20) is asymmetrical and has a bearing lug (25) in the form of an arched segment on only one side of the central section (26).

4 Claims, 3 Drawing Sheets

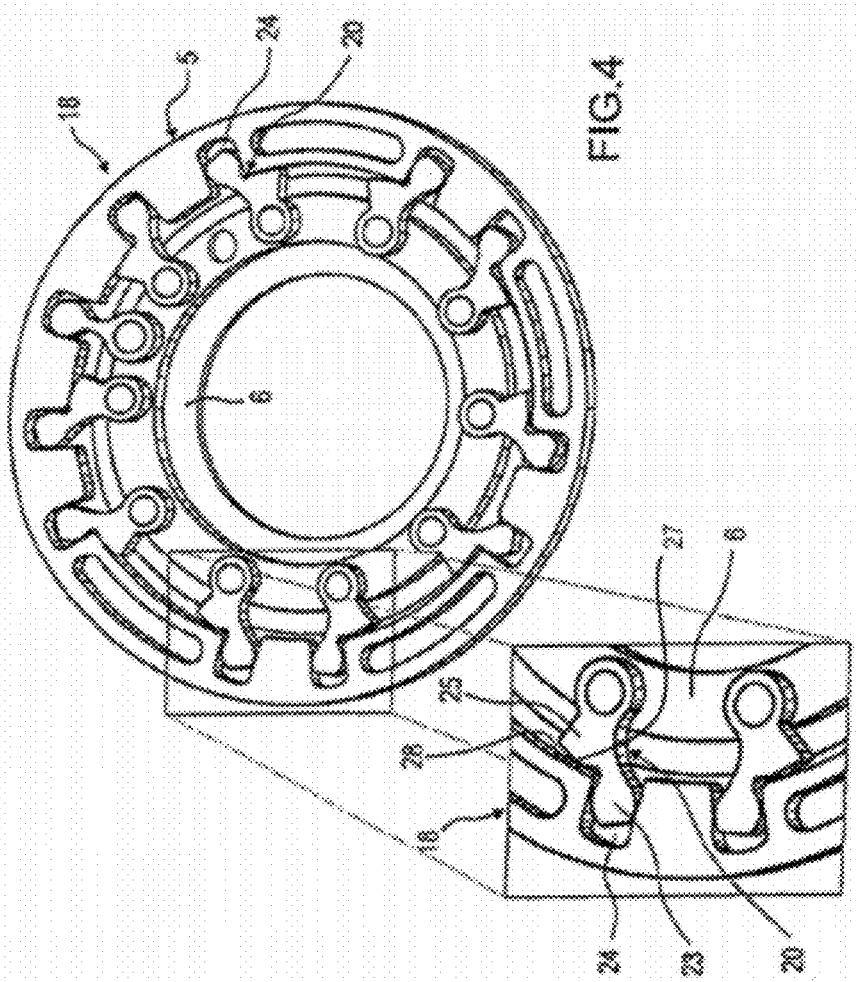
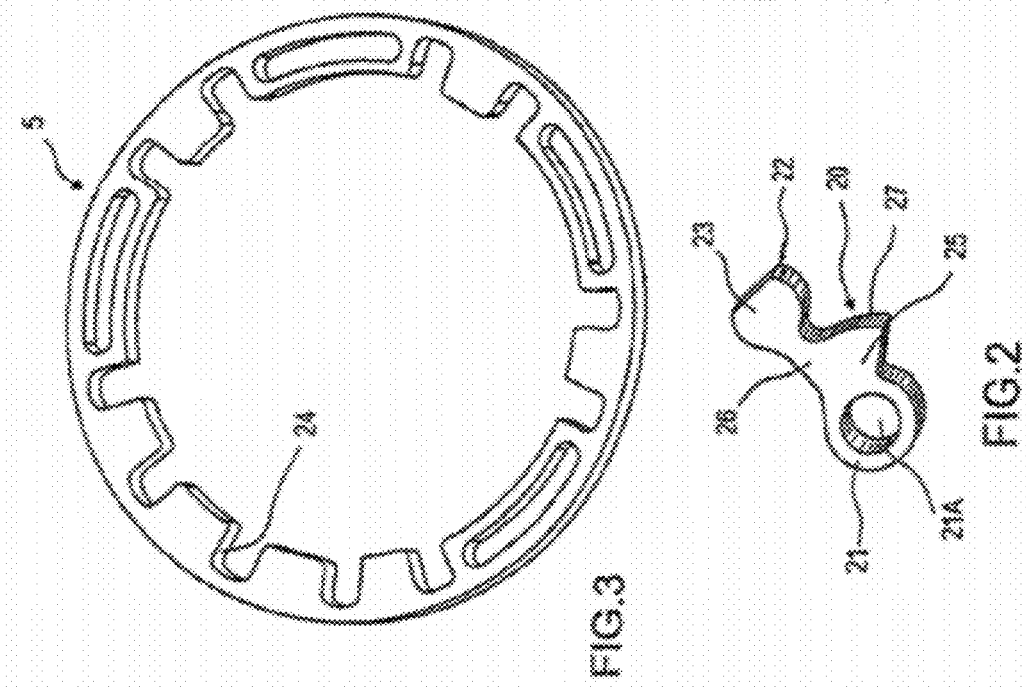

TURBOCHARGER COMPRISING ADJUSTABLE GUIDE BLADES, BLADE LEVER AND ADJUSTING RING THEREFOR

The invention relates to a turbocharger as per the preamble of claim 1.

A turbocharger of said type is known from EP 1 357 255 A1. To avoid bearing elements such as balls or pins between the blade mounting ring and the adjusting ring, said document proposes blade levers which, at both sides of the blade head, have bearing surfaces which, in one embodiment, are supported against mating surfaces of the adjusting ring.

In contrast, it is an object of the present invention to create a turbocharger of the type specified in the preamble of claim 1 which permits a further simplification of the design of the guide grate or guide device.

Said object is achieved by means of the features of claim 1.

The design according to the invention permits an adjustment of the blade levers or guide blades in the same plane in which the radial mounting of the adjusting ring also takes place. As a result of said one plane, it is made possible in a cost-effective manner for the guide grate or guide device of the turbocharger according to the invention to be designed without rolling bodies, since the production of the blade levers and adjusting rings takes place in only one plane.

The subclaims have advantageous refinements of the invention as their content.

It is obtained in particular, by means of a non-uniform pitch of the adjusting ring, which generates a non-uniform distribution of the engagement recesses, that the adjusting ring can be supported by means of one or more levers at all operating points.

Furthermore, it is ensured by means of a slight rotation of the adjusting levers with respect to one another that theoretically all of the adjusting levers are in engagement for up to 35° deflection angle at the blade central position.

The position of the lever head with respect to the blade is different for all blades, at least in pairs, such that the levers are fastened, in particular welded, to the blade shaft in different angular positions.

Another claim defines a blade lever as a separately marketable object.

Further details, advantages and features of the invention can be gathered from the following description of an exemplary embodiment on the basis of the drawing, in which:

FIG. 2 is a perspective illustration of a blade lever according to the invention;

FIG. 3 shows a plan view of an adjusting ring of the turbocharger according to the invention;

FIG. 4 shows a plan view of an assembled arrangement of a guide grate of the turbocharger according to the invention;

FIG. 5 shows an enlarged detail illustration of the guide grate as per FIG. 4.

Figure 1:
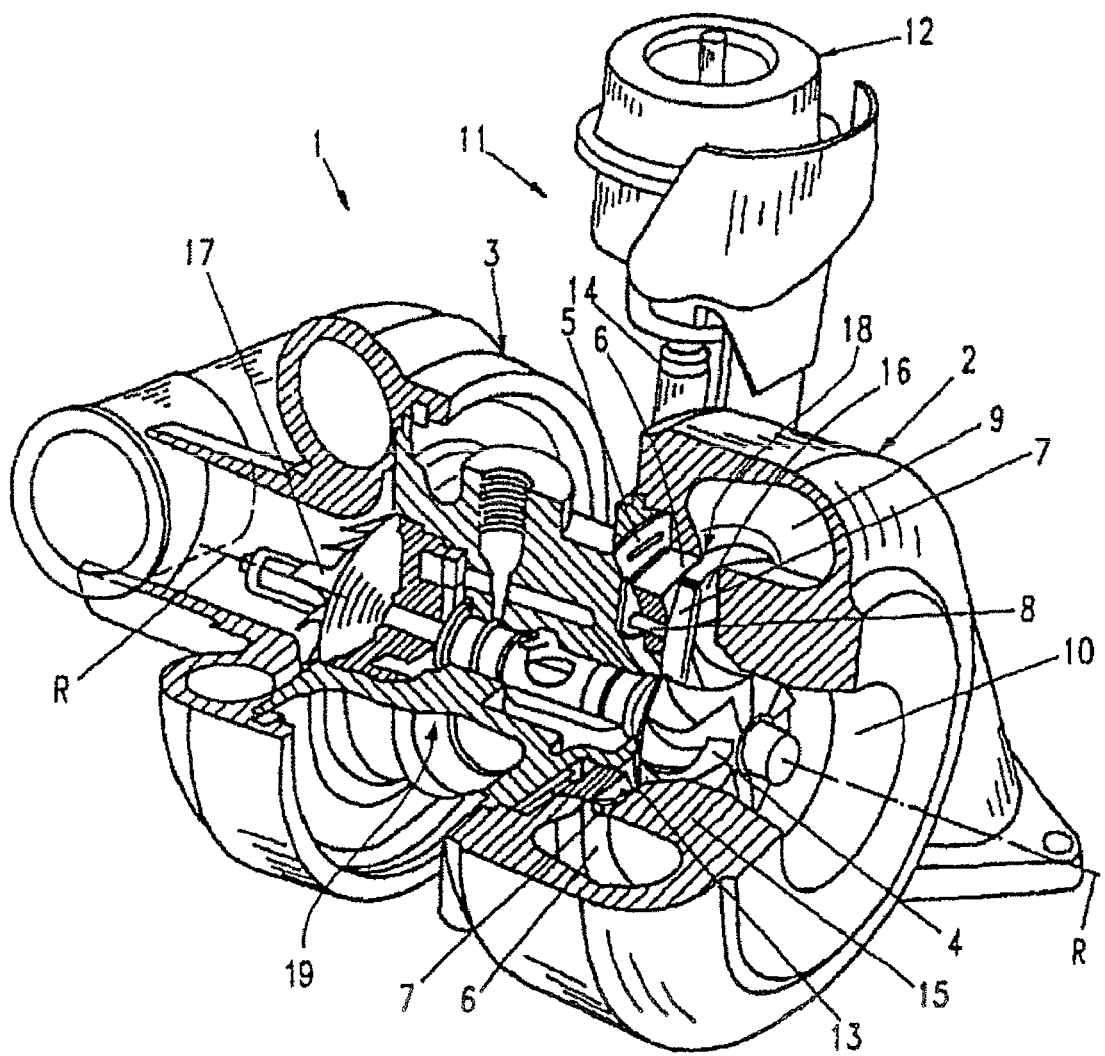
FIG. 1 is a sectioned perspective illustration of the basic design of a turbocharger according to the invention.

FIG. 1 illustrates a turbocharger 1 according to the invention, which has a turbine housing 2 and a compressor housing 3 which is connected to said turbine housing 2 via a bearing housing 19. The housings 2, 3 and 19 are arranged along a rotational axis R. The turbine housing 2 is shown partially in section in order to show the arrangement of a blade mounting ring 6 as part of a radially outer guide grate 18 which has a plurality of guide blades 7 which are distributed over the periphery and have pivot axles or blade shafts 8. In this way, nozzle cross sections are formed, which nozzle cross sections become larger or smaller depending on the position of the guide blades 7 and act on the turbine rotor 4, which is mounted in the center on the rotational axis R, to a greater or lesser extent with exhaust gas, which is supplied via a supply duct 9 and is discharged via a central pipe stub 10, of an engine, in order, by means of the turbine rotor 4, to drive a compressor rotor 17 which is seated on the same shaft.

To control the movement or the position of the guide blades 7, an actuating device 11 is provided. Said actuating device 11 can be of any desired design, but a preferred embodiment has a control housing 12 which controls the control movement of a plunger element 14, which is fastened thereto, in order to convert the movement of said plunger element 14 into a slight rotational movement of an adjusting ring 5 which is situated behind the blade mounting ring 6. Formed between the blade mounting ring 6 and an annular part 15 of the turbine housing 2 is a free space 13 for the guide blades 7. In order to be able to ensure said free space 13, the blade mounting ring 6 has integrally formed spacers 16. In the example, three spacers 16 are arranged on the periphery of the blade mounting ring 6 at an angular interval of in each case 120°. In principle, it is however possible to provide more or fewer spacers 16 of said type.

FIG. 2 shows, in detail, a blade mounting ring 20 representative of the blade levers, used in the present invention, of the turbocharger 1 according to the invention.

The blade lever 20 is a planar part with two ends 21 and 22. The end 21 has a recess 21A into which one end of an assigned blade shaft 8 can be inserted and fixed in a rotationally secured manner. Said fastening takes place conventionally by means of welding.

The other end 22 is formed by a lever head 23 which, in the example, has a flattened end surface, which can however alternatively also be rounded.

The lever head 23 tapers in the direction of a central section 26 which, in the illustration in FIG. 2, merges in one piece at its right-hand side into a bearing lug 25 which has an arc-segment-shaped contact surface 27. Said contact surface 27 is supported, in the assembled state, against a mating surface of the adjusting ring 28 for a combined rolling and sliding movement, as can be seen in detail from the illustration of the assembled guide grate 18 in FIGS. 4 and 5, which will be explained in more detail below.

FIG. 3 illustrates a plan view of the adjusting ring 5 of the turbocharger 1 according to the invention. Said plan view shows that the adjusting ring 5 has a plurality of engagement recesses, one of which is denoted as a representative by the reference symbol 24. FIG. 3 shows that the adjusting ring 5 has a non-uniform pitch of said engagement recesses 24, with four groups being formed in the example, one of which comprises five adjacent engagement recesses 24, and the other three of which each comprise two adjacent engagement recesses 24.

As shown in detail in FIGS. 4 and 5, in the assembled state of the guide grate or guide device 18, the lever heads 23 of the respective guide blades 7 (not visible in these figures) engage into the associated engagement recesses 24 of the adjusting ring 5. FIG. 4 in particular shows that the bearing lugs 25 point in different directions.

Above all, the enlarged illustration of FIG. 5 shows, in terms of the example of the blade lever denoted therein by the reference symbol 20, that the associated bearing lug 25 is supported with its bearing surface 27 on a mating surface 28 of the adjusting ring 5, such that the latter can be mounted radially without rolling bodies, with a combined rolling and sliding movement resulting from the arc-segment-shaped design of the contact surface 27 of the bearing lug 25.

Figure 8:
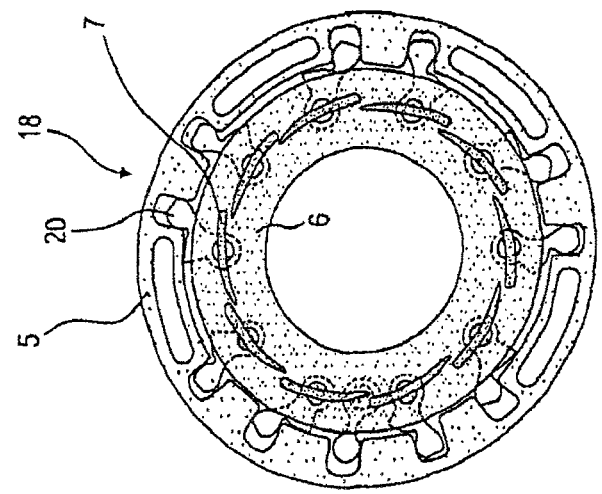
FIGS. 6-8 show plan views of the guide grate of the turbocharger according to the invention in different guide blade positions.
Figure 7:
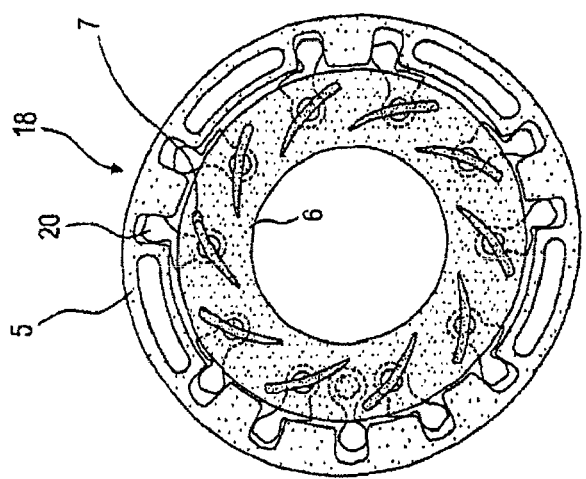
Figure 6:
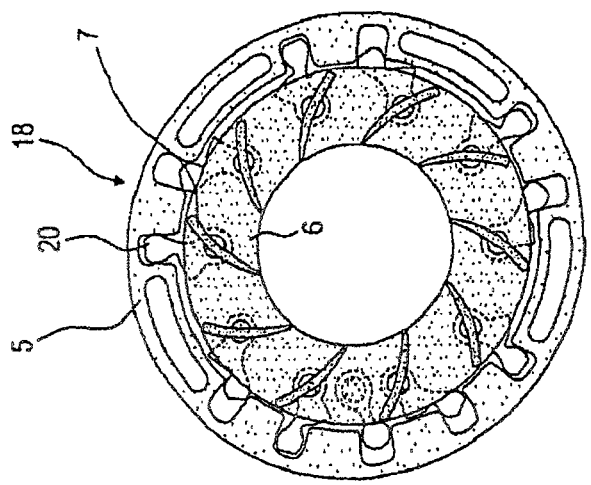

Finally, FIGS. 6 to 8 show different positions of the guide blades 7.

FIG. 6 shows an open blade position, while FIGS. 7 and 8 show a semi-open and a closed blade position of the guide blades 7. As a result of the slight rotation of the blade levers 20 with respect to one another, it is ensured here that theoretically all of the levers are in engagement for up to 35° deflection angle at the blade central position.

To complement the disclosure, reference is made explicitly to the diagrammatic illustration of the invention in FIGS. 1 to 8.

LIST OF REFERENCE SYMBOLS

1 Turbocharger
2 Turbine housing
3 Compressor housing
4 Turbine rotor
5 Adjusting ring
6 Blade mounting ring
7 Guide blades
8 Blade shaft
9 Supply duct
10 Axial port
11 Actuating device
12 Control housing
13 Free space for guide blades 7
14 Plunger element
15 Annular part of the turbine housing 2
16 Spacer/spacer cam
17 Compressor rotor
18 Guide grate/Guide device
19 Bearing housing
20 Blade lever
21, 22 Ends of blade lever 20
21a Recess
23 Lever head
24 Engagement recesses
25 Bearing lugs
26 Central section
27 Contact surface
28 Mating surface

The invention claimed is:

1. A turbocharger (1) with variable turbine geometry (VTG)
   having a turbine housing (2) with a supply duct (9) for exhaust gases;
   having a turbine rotor (4) which is rotatably mounted in the turbine housing (2); and
   having a guide grate (18),
      which surrounds the turbine rotor (4) radially at the outside,
      which has a blade mounting ring (6),
      which has a plurality of guide blades (7) which have in each case one blade shaft (8) which is mounted in the blade mounting ring (6), and
      which has an adjusting ring (5) which is operatively connected to the guide blades (7) by means of assigned blade levers (20), each blade lever (20) having ends (21, 22), each blade lever (20) being fastened to a respective one of the blade shafts (8) at one of its ends (21), with each blade lever (20) having, at the other end (22), a lever head (23) which can be placed in engagement with an associated engagement recess (24) of the adjusting ring (5),
   wherein each blade lever (20) has an axis from one of its ends (21) to the other end (22) and the blade lever is asymmetric about the axis and has an arc-segment-shaped bearing lug (25) only on one side of the axis, which bearing lug (25) is arranged in the same plane as the lever head (23).

2. The turbocharger as claimed in claim 1, wherein the blade levers (20) engage with bearing lugs (25), which point in different directions, into the associated engagement recesses (24) of the adjusting ring (5), wherein the blade levers (20) are arranged such that the side of each blade lever (20) with the bearing lug (25) faces toward the side of a neighboring blade lever (20) that has the bearing lug (25).

3. A blade lever for a turbocharger (1) with variable turbine geometry
   having ends (21, 22), having an axis from one of its ends (21) to the other end (22) wherein the blade lever is asymmetric about the axis
   having a recess (21A), which is arranged at one of the ends (21), for fastening one end of a blade shaft (8),
   having a lever head (23), which is arranged at the other end (22), and
   having a central section (26) between the recess (21A) and the lever head (23),
   wherein an arc-segment-shaped bearing lug (25) is provided only on one side of the axis, which bearing lug (25) is arranged in the same plane as the lever head (23).

4. The turbocharger as claimed in claim 1, wherein the position of the lever head with respect to the blade is different for adjacent blade levers.

* * * * *